US008950801B2

(12) United States Patent
Tabeta et al.

(10) Patent No.: US 8,950,801 B2
(45) Date of Patent: Feb. 10, 2015

(54) CONSTRUCTION MACHINE

(75) Inventors: Hiroshi Tabeta, Konan (JP); Shogo Kimura, Ritto (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/117,945

(22) PCT Filed: Jun. 13, 2012

(86) PCT No.: PCT/JP2012/065120
§ 371 (c)(1), (2), (4) Date: Nov. 15, 2013

(87) PCT Pub. No.: WO2013/021725
PCT Pub. Date: Feb. 14, 2013

(65) Prior Publication Data

US 2014/0070568 A1 Mar. 13, 2014

(30) Foreign Application Priority Data

Aug. 9, 2011 (JP) ................................ 2011-173876

(51) Int. Cl.

| | |
|---|---|
| ***B62D 33/06*** | (2006.01) |
| ***E02F 9/16*** | (2006.01) |
| ***E02F 3/32*** | (2006.01) |
| ***E02F 3/96*** | (2006.01) |
| ***E02F 9/08*** | (2006.01) |
| ***B66C 13/54*** | (2006.01) |

(52) U.S. Cl.
CPC . *E02F 9/16* (2013.01); *E02F 3/325* (2013.01); *E02F 3/964* (2013.01); *E02F 9/0833* (2013.01); *E02F 9/0858* (2013.01); *B66C 13/54* (2013.01)
USPC .................. 296/190.01; 296/190.09; 296/208

(58) Field of Classification Search
CPC .... B62D 33/06; B62D 25/2009; B62D 25/20; B62D 25/2018; B62D 25/2027; B62D 25/2036
USPC ............. 296/190.01, 190.07, 190.09, 193.07, 296/208
See application file for complete search history.

(56) References Cited

U.S. PATENT DOCUMENTS

| | | | | |
|---|---|---|---|---|
| 7,537,074 | B2 | 5/2009 | Ishii et al. | |
| 7,559,601 | B2 | 7/2009 | Ishii et al. | |
| 8,616,619 | B2 * | 12/2013 | Kimura et al. | 296/190.09 |

(Continued)

FOREIGN PATENT DOCUMENTS

| | | | |
|---|---|---|---|
| JP | 2003-211942 | A | 7/2003 |
| JP | 2008-013033 | A | 1/2008 |
| WO | 2004/078562 | A1 | 9/2004 |
| WO | 2005/083186 | A1 | 9/2005 |
| WO | 2009/022510 | A1 | 2/2009 |

*Primary Examiner* — Jason S Morrow
(74) *Attorney, Agent, or Firm* — Mattingly & Malur, PC

(57) ABSTRACT

A floor member comprises a lever-pedal mounting part in a front side, an operator's seat mounting part in a rear side, an indoor unit mounting surface part on which an indoor unit is mounted under the operator's seat mounting part, an entrance surface part which is provided in a door side between the indoor unit mounting surface part and the lever-pedal mounting part and on which an operator places a foot at getting-in/off, and a foot rest part which is surrounded by the lever-pedal mounting part, the indoor unit mounting surface part and the entrance surface part. The indoor unit mounting surface part and the entrance surface part form a successive plane successively extending with each other in a position lower by one step than the lever-pedal mounting part and the foot rest part.

5 Claims, 11 Drawing Sheets

(56) References Cited

U.S. PATENT DOCUMENTS 8,632,122 B2 * 1/2014 Kimura et al. ........... 296/190.05
2007/0131262 A1 * 6/2007 Ishii et al. ..................... 134/123
2010/0102594 A1 * 4/2010 Kimura et al. ........... 296/190.01
2013/0270867 A1 * 10/2013 Obe et al. ................. 296/190.09
2014/0124280 A1 * 5/2014 Kimura et al. ............. 180/89.12

* cited by examiner

CONSTRUCTION MACHINE

TECHNICAL FIELD

The present invention relates to a construction machine, for example, equipped with a cab box on a floor member, and to a construction machine, such as a hydraulic excavator or hydraulic crane.

BACKGROUND ART

Generally, a hydraulic excavator as a representative example of a construction machine largely constituted by an automotive lower traveling structure, an upper revolving structure mounted on the lower traveling structure to be capable of revolving thereon, and a working mechanism mounted to be capable of lifting and tilting in a front side of the upper revolving structure.

The upper revolving structure is provided with a revolving frame forming a support structure, a floor member which is provided on the revolving frame and on which an operator's seat is mounted, and a cab box which is provided to cover the periphery and the upper side of the floor member, forms an occupying space therein, and has a door openable and closable on an outer surface in one of the right-left direction.

Here, an example of the hydraulic excavator includes a small-sized hydraulic excavator so-called a mini-excavator. In the small-sized hydraulic excavator, the lower traveling structure is set to have a small width dimension in such a manner as to be capable of performing a work even in a narrow work site such as a residence area or an alley. On the other hand, the upper revolving structure is formed in a compact size not to protrude largely out of the narrowly-wide lower traveling structure at the revolving movement. Therefore, in the small-sized hydraulic excavator, the floor member and the cab box are downsized, and an installation space for devices mounted on the floor member, for example, an indoor unit in an air-conditioning unit for supplying conditioned air to an occupying space is also made small.

Therefore, in regard to the small-sized hydraulic excavator, there is known a hydraulic excavator in which a concave portion is formed in a position of a foot rest part in the floor member on which an operator seated on an operator's seat places a foot, an indoor unit is accommodated in the concave portion and an upper side of which is covered with a closing plate (for example, refer to Patent Document 1 and Patent Document 2).

On the other hand, since the foot rest part of the floor member has a relatively small floor area, it is difficult to ensure a space for accommodating the indoor unit. Therefore, there is known a small-sized hydraulic excavator of a different type in which an indoor unit accommodating space is formed under an operator's seat mounting portion for mounting the operator's seat and an indoor unit is accommodated in the indoor unit accommodating space (for example, refer to Patent Document 3 and Patent Document 4).

In this case, the operator's seat mounting portion is formed to be high for ensuring the indoor unit accommodating space in a low side thereof, and as a result, a mounting position of the operator's seat also becomes high. Therefore, when the operator is seated on the operator's seat, a head clearance between a head of the operator and a ceiling of the cab box is made small, worsening a working environment of the operator because of a constrained feeling. The cab box is required to be large-sized for ensuring this head clearance.

Further, there is known an excavator with the other conventional art in which an opening is provided in the floor member to be positioned under the operator's seat mounting portion for restricting the mounting position of the indoor unit to a low position, a concave-shaped cover that is recessed to a lower side is mounted to this opening, and the indoor unit is accommodated in the concave-shaped cover. By arranging the indoor unit in the concave-shaped cover, the mounting position of the indoor unit can be restricted to the low position (for example, refer to Patent Document 5).

PRIOR ART DOCUMENT

Patent Document

Patent Document 1: International Publication No. WO2004/078562

Patent Document 2: International Publication No. WO2005/083186

Patent Document 3: Japanese Patent Laid-Open No. 2008-13033 A

Patent Document 4: International Publication No. WO2009/022510

Patent Document 5: Japanese Patent Laid-Open No. 2003-211942 A

SUMMARY OF THE INVENTION

Incidentally, since in the hydraulic excavator by Patent Document 5 as described above, the indoor unit can be arranged in the low position, the occupying space in the cab box can be widened. However, the concave-shaped cover is provided in the position lower than the foot rest part of the floor member to accommodate the indoor unit therein. Therefore, in a case where water at car washing or earth and sand attached to shoes enters into the concave-shaped cover, this water or earth and sand is never discharged naturally. As a result, when the water or earth and sand enters into the concave-shaped cover, there is a possibility that the water or earth and sand remains and is accumulated therein to accelerate degradation of the indoor unit, or pipes or wires connected thereto.

On the other hand, for discharging the water or earth and sand which has entered into the concave-shaped cover, a discharging hole is provided in a bottom portion of the cover, and by opening a cap for closing the discharging hole, the entered water or earth and sand can be discharged. However, an operator is required to put a hand into the lower side of the operator's seat mounting portion for opening the cap, thus requiring labors and hours for the working. Further, there is a problem that the revolving frame becomes dirty because of the water or earth and sand discharged from the discharging hole.

In view of the foregoing problem in the conventional art, it is an object of the present invention to provide a construction machine that can enlarge an occupying space in a cab box and can discharge water or earth and sand that has entered into an indoor unit mounting surface part outside of an upper revolving structure in a simple work.

(1) A construction machine according to the present invention comprising: an automotive lower traveling structure; an upper revolving structure mounted on the lower traveling structure to be capable of revolving thereon; and a working mechanism provided to the upper revolving structure to be capable of lifting and tilting thereto, wherein the upper revolving structure comprises: a revolving frame forming a support structure; a floor member which is provided on the revolving frame and on which an operator's seat is mounted; a cab box which is provided to cover the periphery and the upper side of the floor member, forms an occupying space therein, and includes a door capable of opening/closing on an outer surface in one of the right-left direction; and an indoor unit in an air-conditioning unit mounted to the floor member for supplying intake air to the occupying space as conditioned air.

For solving the aforementioned problems, the configuration adopted by the present invention is characterized in that the floor member comprises: a lever-pedal mounting part which is positioned in a front side and to which a traveling lever-pedal is mounted; an operator's seat mounting part which is positioned in a rear side to be surrounded by left and right side plates and a rear plate, and on which a risen-up platform is formed and the operator's seat is mounted; an indoor unit mounting surface part which is positioned in an indoor unit accommodating space under the platform of the operator's seat mounting part and on which the indoor unit is mounted; an entrance surface part which is positioned between the indoor unit mounting surface part and the lever-pedal mounting part and is provided in a side of the door in the cab box and on which an operator places a foot at getting-in/off; and a foot rest part which is provided to be surrounded by the lever-pedal mounting part, the indoor unit mounting surface part and the entrance surface part, and on which the operator seated on the operator's seat places a foot, wherein the lever-pedal mounting part and the foot rest part form a successive plane successively extending with each other in a height position where the operator seated on the operator's seat can place a foot, and the indoor unit mounting surface part and the entrance surface part form a successive plane successively extending with each other in a position lower by one step than a height position of the lever-pedal mounting part and the foot rest part.

With this arrangement, the indoor unit mounting surface part forms the successive plane with the entrance surface part successively extending with each other, that is, the same plane in the position lower by one step than the foot rest part arranged in the height position where the operator seated on the operator's seat can place a foot. Therefore, the indoor unit can be mounted in the position lower by one step than the foot rest part, and can form the operator's seat mounting part of the floor member to be low. Thereby, also in a case of the small-sized cab box, the head clearance between the head of the operator seated on the operator's seat and the ceiling of the cab box can be made large to improve the working environment.

Here, in a case where the indoor unit mounting surface part is positioned lower by one step than the foot rest part, in some cases water or earth and sand enters into the indoor unit mounting surface part. However, since the indoor unit mounting surface part forms the successive plane with the entrance surface part successively extending with each other, the water or earth and sand having entered into the indoor unit mounting surface part can easily be swept away through the entrance surface part or washed away with water. In this case, the water or earth and sand can be discharged outside of the upper revolving structure from the entrance surface part.

As a result, even in a case where the indoor unit mounting surface part is provided in the position lower than the foot rest part, the water or earth and sand can be discharged through the entrance surface part in a simple work. Therefore, the periphery of the indoor unit can be cleaned to extend the lifetime of the indoor unit or pipes and wires connected thereto.

(2) According to the present invention, the floor member is provided with a concave groove-shaped duct mounting surface part extending forward from the indoor unit mounting surface part between a side plate at the opposite side to the door and the foot rest part, the duct mounting surface part is formed as a successive plane with the indoor unit mounting surface part successively extending with each other, and the duct mounting surface part accommodates an air supply duct for supplying conditioned air blown out from the indoor unit to a front side of the occupying space.

With this arrangement, since the floor member is provided with the duct mounting surface part formed as the successive plane with the indoor unit mounting surface part successively extending with each other, the air supply duct extending forward can be connected to the indoor unit in the air-conditioning unit. As a result, the height of the air supply duct can be restricted to be lower to the extent that the indoor unit mounting surface part is positioned to be by one step than the foot rest part to widen the occupying space in the cab box.

(3) According to the present invention, the foot rest part is surrounded by the indoor unit mounting surface part, the entrance surface part and the duct mounting surface part, and is formed as a trapezoidal plane extending in a trapezoidal shape from the lever-pedal mounting part toward the rear side.

With this arrangement, the trapezoidal plane can be provided to extend from the lever-pedal mounting part to the rear side by using a range surrounded by the indoor unit mounting surface part, the entrance surface part, and the duct mounting surface part. This trapezoidal plane can be formed as a front widening plane as the foot rest part of an operator to ensure a width sufficient for the operator to place a foot on.

(4) According to the present invention, the foot rest part is provided with a falling portion bent downward at a door-side end portion, the falling portion is formed to be inclined in a direction of leaving the door in the cab box toward the rear side to have a front end portion as a starting point, and the entrance surface part is formed as a triangular plane in a triangular shape between the falling portion) of the foot rest part and an end edge portion of the door side in the cab box.

With this arrangement, the entrance surface part is formed as the triangular plane inclined in a direction of leaving the door of the cab box toward the rear side to have the front end portion as a starting point. Therefore, the entrance surface part can be formed to have a wide foot step area at the rear side while avoiding a pedal or the like arranged in the lever-pedal mounting part. As a result, the operator, even if the foot is shifted when the operator gets onto or steps down the floor member, can certainly place the foot on the entrance surface part by using a spot having the wide foot step area to enhance reliability to the incoming/outgoing movement.

(5) According to the present invention, the floor member is provided with a front cover at a front side of the operator's seat mounting part for covering and hiding the indoor unit in the indoor unit accommodating space, wherein the front cover makes contact with a rear end of the foot rest part.

With this arrangement, the indoor unit provided in the indoor unit accommodating space can be covered and hidden by mounting the front cover to the rear end of the foot rest part. On the other hand, when the front cover is removed from the floor member, an inspection work, a repair work and the like of the indoor unit can easily be performed.

MODE FOR CARRYING OUT THE INVENTION

Hereinafter, a small-sized hydraulic excavator will be explained as an example of a construction machine applied to an embodiment of the present invention with reference to FIG. 1 to FIG. 11.

Figure 1:
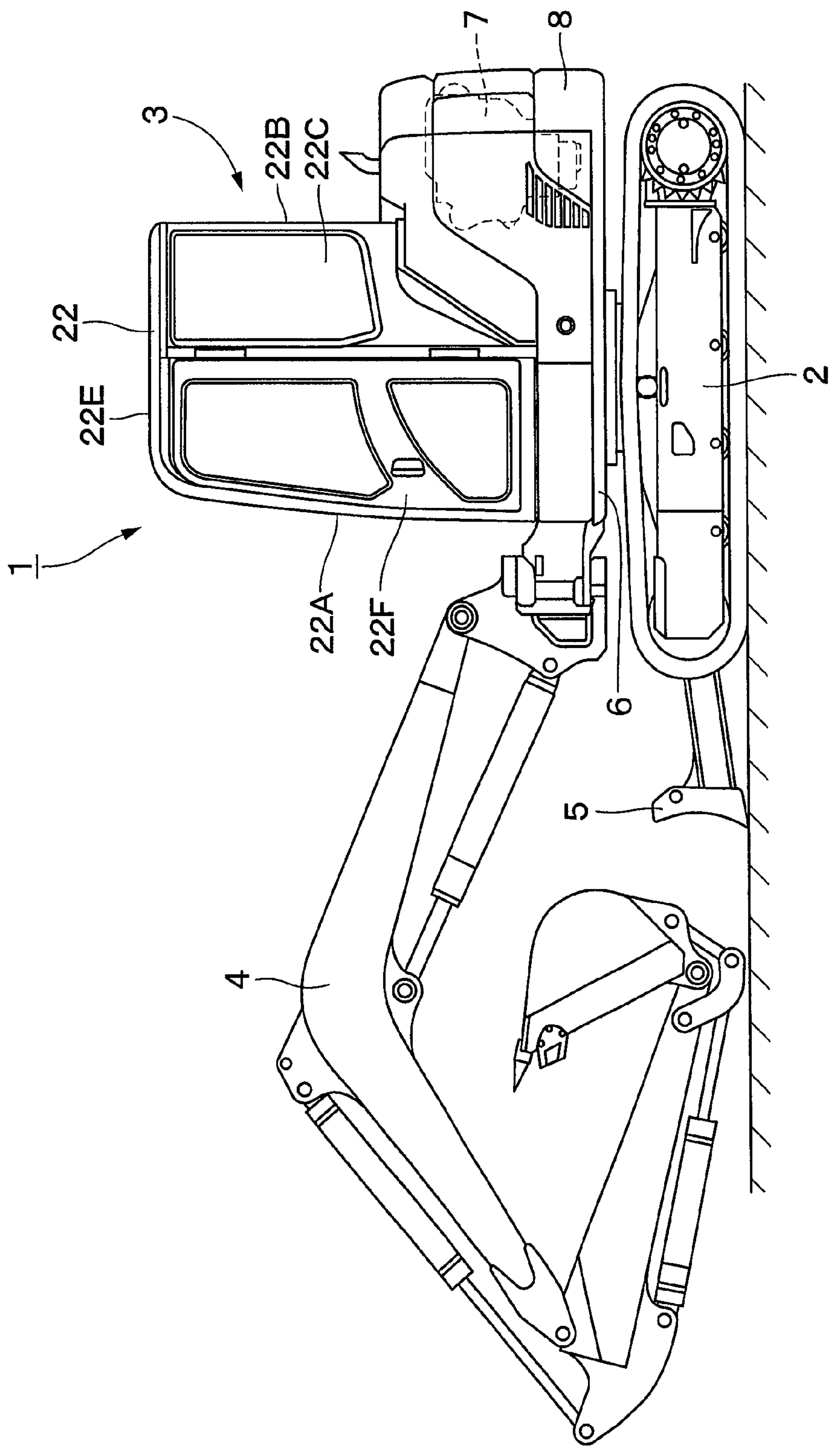
FIG. 1 is a front view showing a hydraulic excavator which is applied to an embodiment of the present invention.

In FIG. 1, designated at 1 is a hydraulic excavator as a typical example of a construction machine applied to the present embodiment. This hydraulic excavator 1 is a small-sized hydraulic excavator called a mini-excavator suitable for work at a narrow working site. The hydraulic excavator 1 is configured by an automotive lower traveling structure 2, an upper revolving structure 3 mounted on the lower traveling structure 2 to be capable of being revolved thereon, a front working mechanism 4 provided in a front side of the upper revolving structure 3 to perform an excavating work of earth and sand and the like, and an earth and sand removing device 5 for performing an earth and sand removing work.

Here, the upper revolving structure 3 has a width dimension in the right-left direction substantially equal to a vehicle width of the lower traveling structure 2, and is formed in a substantially round shape as viewed from above to be accommodated in a revolving radius when the upper revolving structure 3 revolves. Thereby, the hydraulic excavator 1 is configured as a rear small turn type hydraulic excavator in such a manner that when the upper revolving structure 3 revolves on the lower traveling structure 2, a rear surface of a counterweight 8 to be described later is accommodated substantially within the vehicle width of the lower traveling structure 2. It should be noted that the above-mentioned revolving radius is defined by a distance from a revolving center to the rear surface of the counterweight 8.

Figure 2:
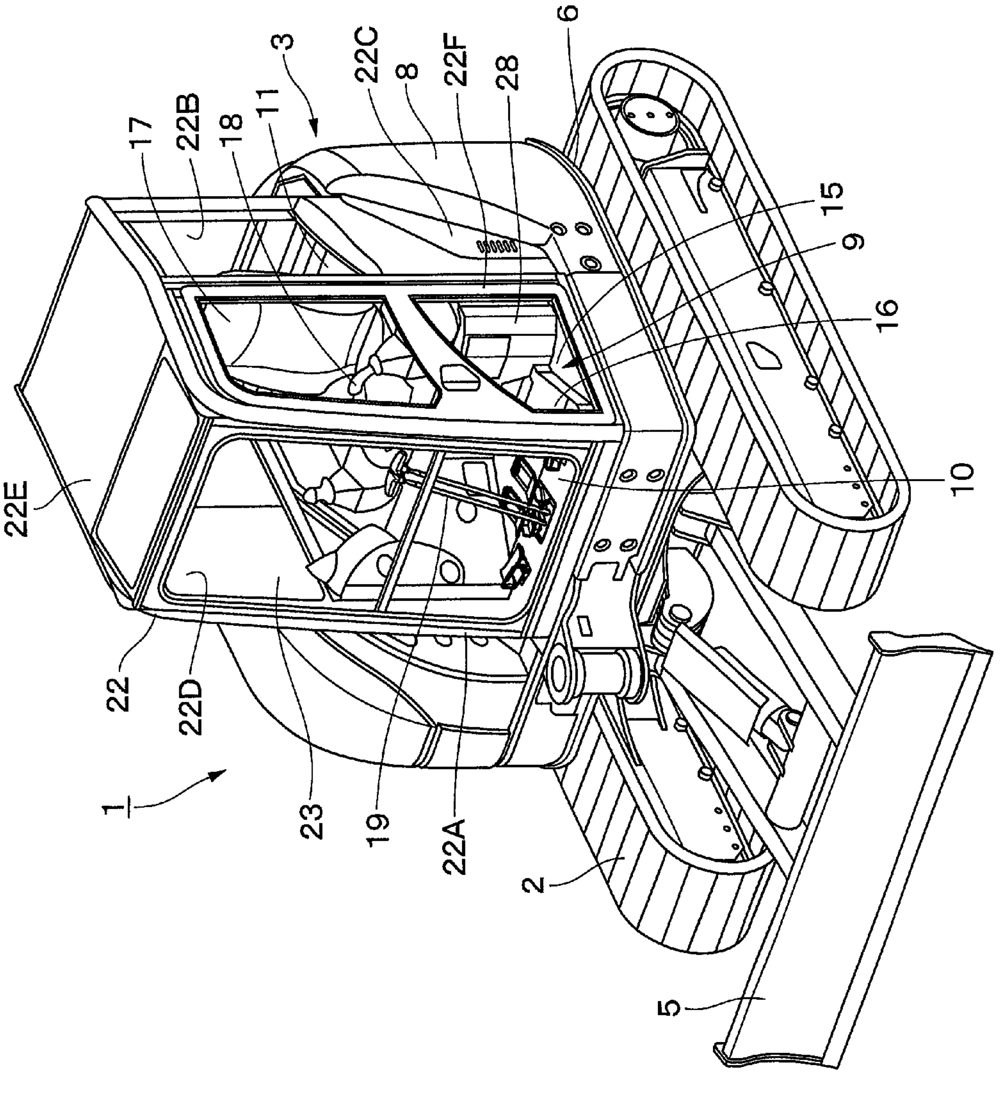
FIG. 2 is an external perspective view showing the hydraulic excavator as viewed from a front side with a front working mechanism being removed.
Figure 3:
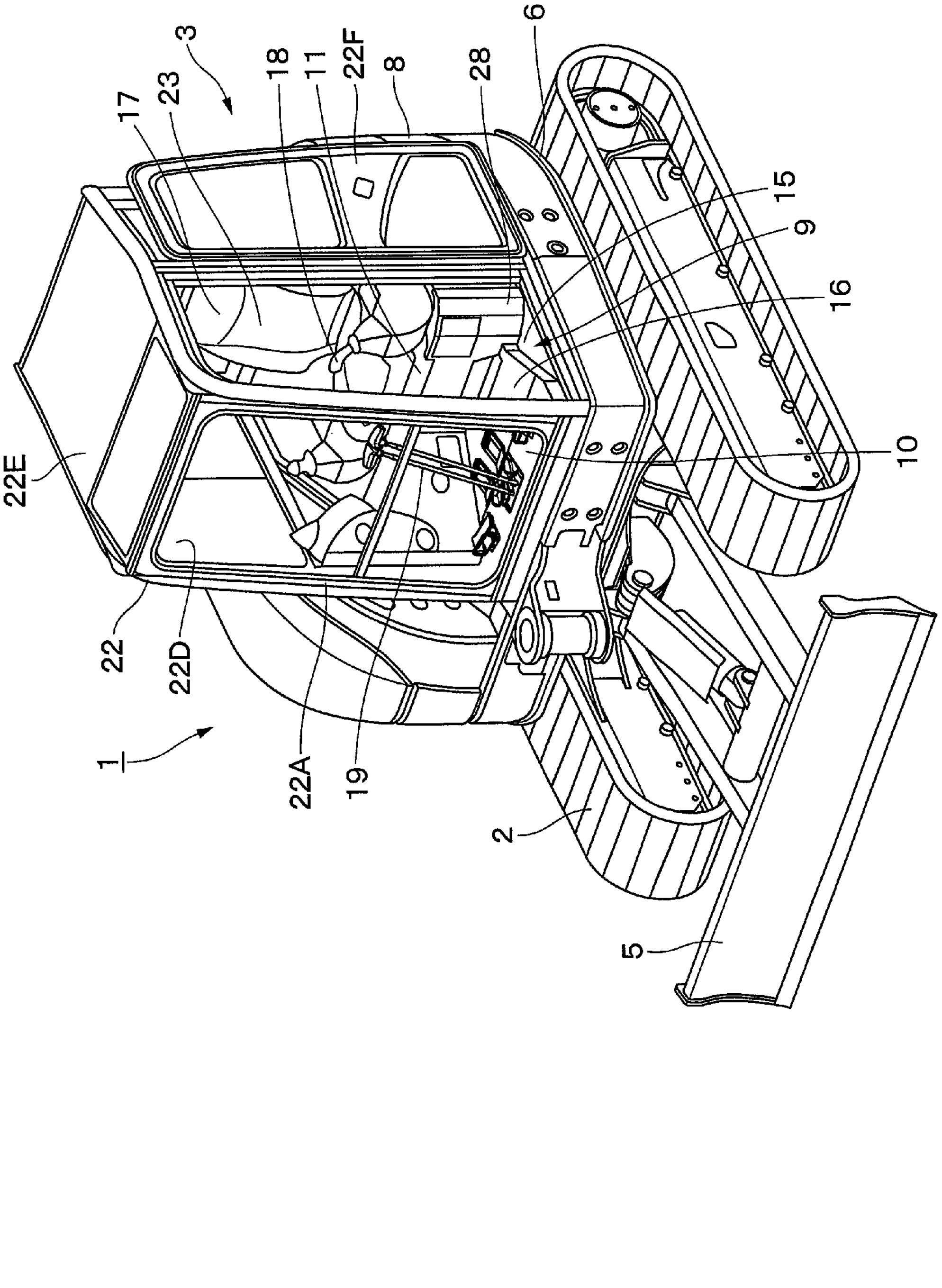
FIG. 3 is an external perspective view showing the hydraulic excavator in FIG. 2 in a state where a door is opened.
Figure 4:
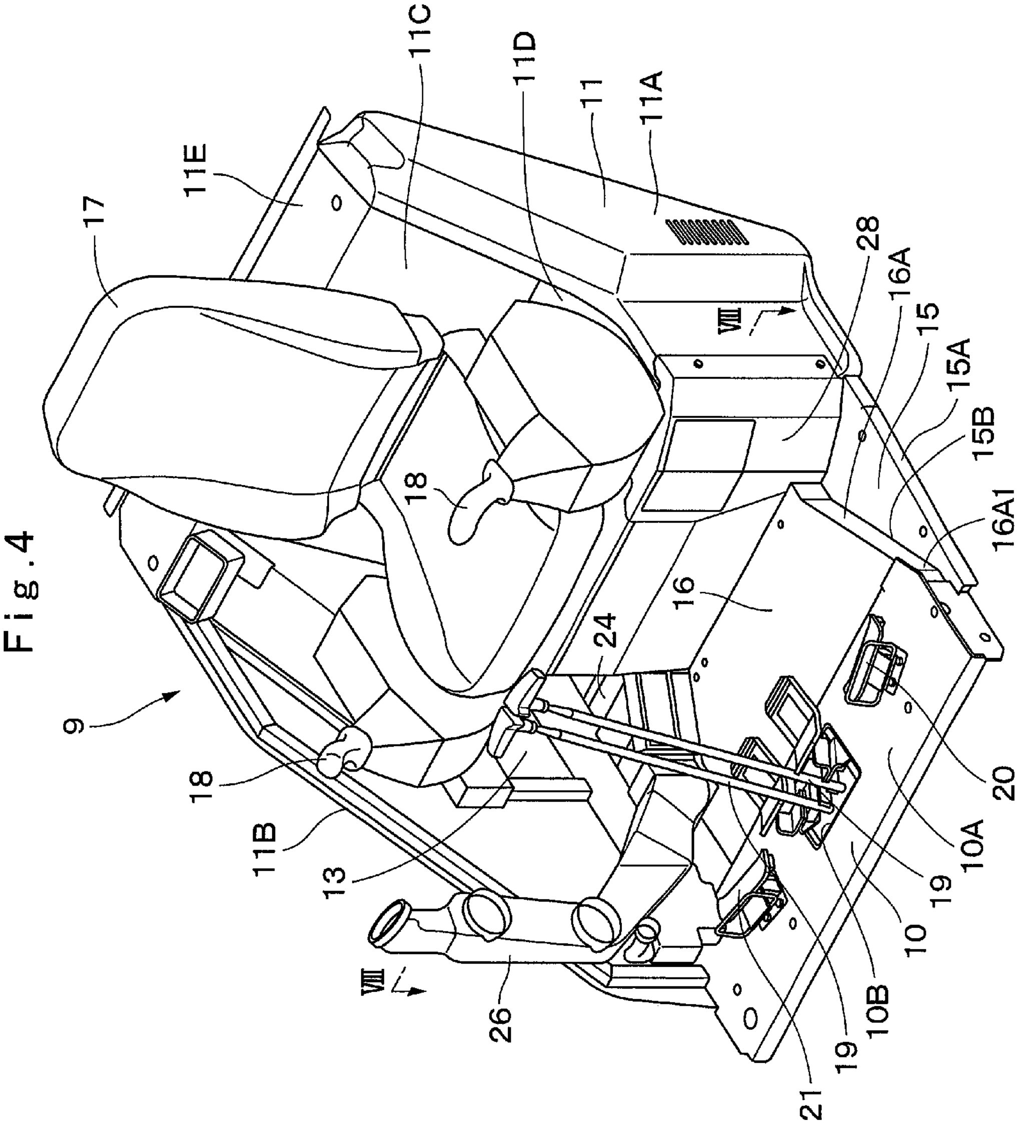
FIG. 4 is an external perspective view showing a floor member, an operator's seat, various operating levers, pedals, an indoor unit, and the like, which are enlarged, in a state where a front cover is mounted.

As shown in FIG. 1 to FIG. 3, the upper revolving structure 3 is configured by a revolving frame 6 forming a support structure, an engine 7 provided on the revolving frame 6, a floor member 9, a cab box 22, an indoor unit 24 in an air-conditioning unit, and the like, which will be described later. The front working mechanism 4 is mounted in the front side of the revolving frame 6 to be capable of swinging and lifting. On the other hand, a support table (not shown) is provided in the rear side of the revolving frame 6 for mounting a mounting plate 11E of an operator's seat mounting part 11 forming the floor member 9 to a side of the revolving frame 6. Two support members (not shown) are mounted in the left front portion of the revolving frame 6 to have an interval in the right-left direction therebetween, and a tilting bracket 10E of a lever-pedal mounting part 10, which will be described herein after, is connected to each of the support members to be capable of tilting (tilting up and tilting down) thereto.

The engine 7 is mounted on the rear side of the revolving frame 6 (shown in a dotted line in FIG. 1), and the engine 7 is arranged in a lateral state to extend in the right-left direction. The engine 7 drives a hydraulic pump (not shown) for rotation.

The counterweight 8 is provided in the rear portion of the revolving frame 6, and acts as a weight balance to the front working mechanism 4. The counterweight 8 is formed to be bent in an arc shape in such a manner as to cover the engine 7 from the rear side.

Next, the floor member 9 provided in front of the engine 7 in the revolving frame 6 will be explained.

Designated at 9 is the floor member provided in front of the engine 7 to be closer to the left side on the revolving frame 6. The floor member 9 is provided such that a front side position thereof is supported in a front side position of the revolving frame 6 to be capable of tilting (tilting up and tilting down) thereto, and a rear side position thereof is mounted and supported on the support table of the revolving frame 6 to be capable of being detachable. As shown in FIG. 4 to FIG. 7, the floor member 9 is configured by a lever-pedal mounting part 10, an operator's seat mounting part 11, an indoor unit mounting surface part 12, an indoor unit accommodating space 13, a duct mounting surface part 14, an entrance surface part 15, a foot rest part 16, and the like, which will be described later.

Figure 6:
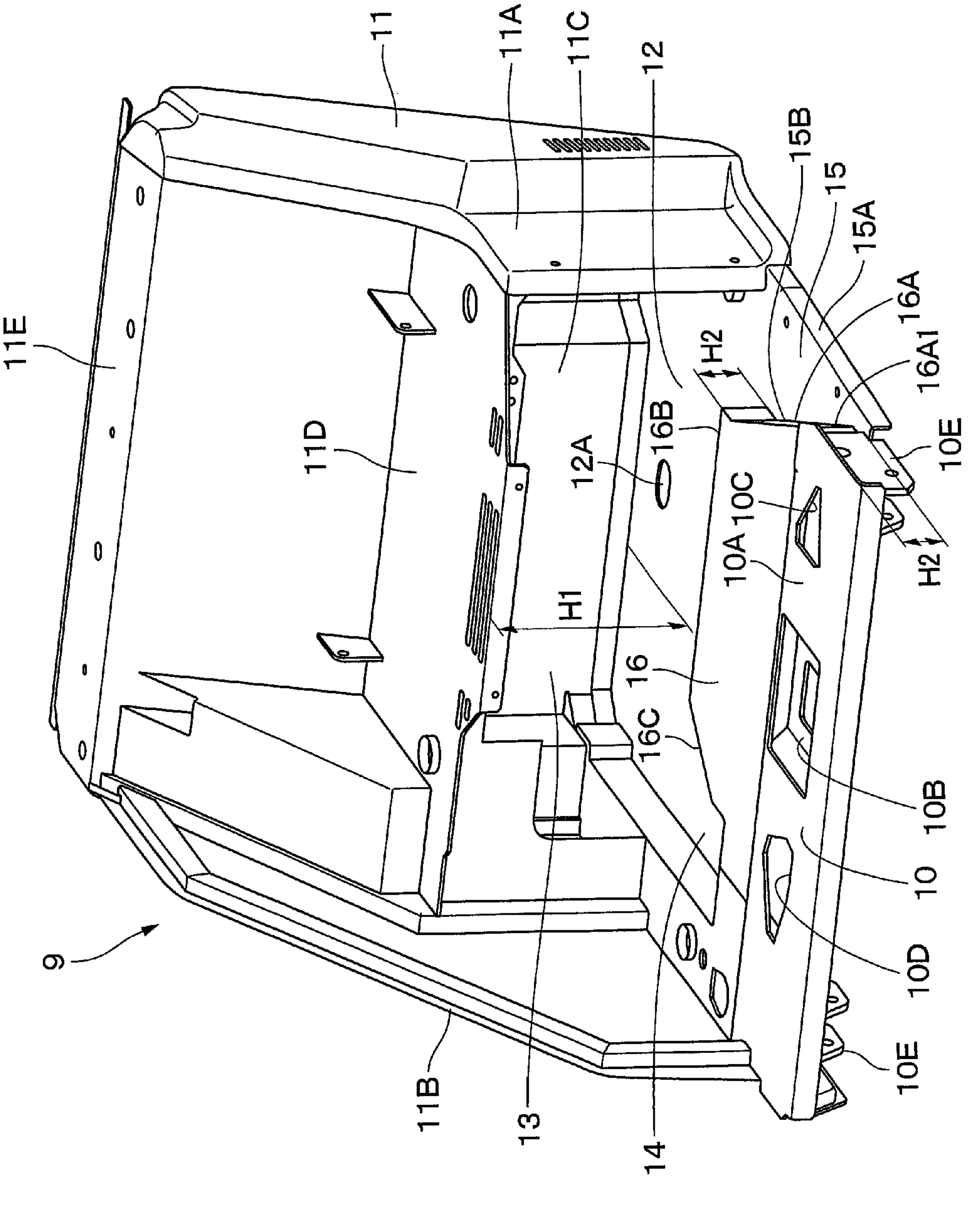
FIG. 6 is an external perspective view showing the floor member as viewed from a front side.

The lever-pedal mounting part 10 is arranged in the front side of the floor member 9, and operating lever-pedals 19 and pedals 20 and 21, which will be described later, are mounted to the lever-pedal mounting part 10. As shown in FIG. 6, the lever-pedal mounting part 10 is provided as a rectangular plane extending in the right-left direction, and a top surface 10A thereof forms a successive plane with a foot rest part 16, which will be described later, successively extending with each other.

The lever-pedal mounting part 10 has the top surface 10A that is in a position higher to the upper side by a dimension H2 to be described later than the entrance surface part 15 to be described later. The top surface 10A is provided with a central opening 10B positioned in the center in the right-left direction to mount the traveling operating lever-pedals 19, a left opening 10C positioned in the left side of the central opening 10B, and a right opening 10D positioned in the right side of the central opening 10B. The pedals 20 and 21 are mounted on the left and right openings 10C and 10D for swinging the front working mechanism 4 and driving an optional hydraulic unit (not shown).

A set of two tilting brackets 10E are provided in the lever-pedal mounting part 10 in each of the right and left sides. The right and left tilting brackets 10E are mounted on the support member provided in the revolving frame 6 through connecting pins (not shown) to be rotatable thereto. As a result, the floor member 9 can tilt at the rear side on a basis of the front side as a fulcrum.

The operator's seat mounting part 11 is provided in the rear side of the floor member 9. The operator's seat mounting part 11 is formed in a platform shape to open toward the front side, and is provided with an operator's seat 17 to be described later on the top side. The operator's seat mounting part 11 is configured by a left side plate 11A positioned in the left side to be installed upright in such a manner as to extend in the front-rear direction, a right side plate 11B positioned in the right side to be installed upright in such a manner as to extend in the front-rear direction, a rear plate 11C installed upright to extend in the right-left direction in the rear side of each of the side plates 11A and 11B for closing the rear side, and a platform 11D that is surrounded by each of the side plates 11A and 11B and the rear plate 11C, and is formed as a horizontal surface in an intermediate position in the upper-lower direction.

Here, as shown in FIG. 6, a height dimension from the indoor unit mounting surface part 12 to be described later to the platform 11D is set to H1. Therefore, when an operator sits on the operator's seat 17 to be described later, a dimension in the upper-lower direction from a seat surface of the operator's seat 17 to the foot rest part 16 is set to a preferable height. The operator's seat mounting part 11 is formed in a platform shape rising upward as a whole. The mounting plate 11E is provided on the upper side of the rear plate 11C to extend in the rear side, and the mounting plate 11E is mounted on the support table of the revolving frame 6.

Figure 9:
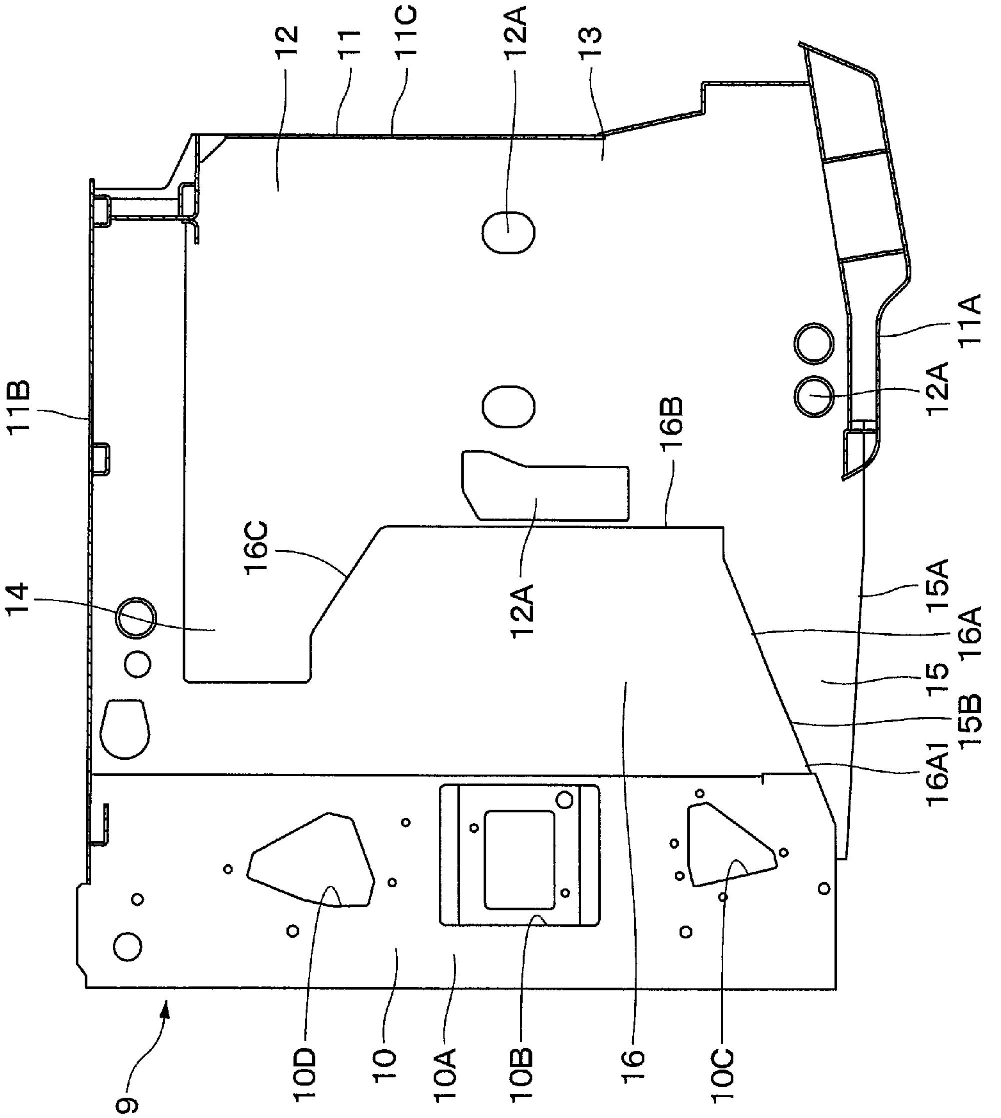
FIG. 9 is a transverse cross section showing the floor member shown in FIG. 8 as a single unit.

The indoor unit mounting surface part 12 is provided under the platform 11D of the operator's seat mounting part 11, and forms a part of the plane. As shown in FIG. 9, the indoor unit mounting surface part 12 is formed by one plate body or by connecting a plurality of plate bodies to form the same plane successive with the duct mounting surface part 14 and the entrance surface part 15 to be described later. The indoor unit mounting surface part 12 is positioned in the lower side in the indoor unit accommodating space 13 to form a bottom surface. That is, the indoor unit mounting surface part 12 is formed as a long, rectangular flat surface in the right-left direction. The indoor unit mounting surface part 12 is provided with a plurality of communicating openings 12A, and pipes and wires are inserted into the respective communicating openings 12A for connecting an indoor unit 24 to be described later and an outdoor unit (not shown) in a side of the engine 7. The communicating opening 12A is air-tightly sealed in the insert state.

As shown in FIG. 6, the indoor unit mounting surface part 12 is arranged in a position lower by one step than the foot rest part 16 to be described later, specifically in a position lower by a dimension H2 in the upper-lower direction than the lever-pedal mounting part 10 and the foot rest part 16. As a result, the indoor unit mounting surface part 12 can arrange the indoor unit 24 to be described later in a position lower by the dimension H2 in the upper-lower direction than the foot rest part 16.

A left front side part of the indoor unit mounting surface part 12 is connected to a rear side part of the entrance surface part 15 to be described later. In this case, the indoor unit mounting surface part 12 and the entrance surface part 15 form a flat successive plane, which successively extend with each other in the same height lower by one step than the foot rest part 16, that is, the same plane. Therefore, also in a case where water at car-washing, earth and sand attached to shoes or the like enters into the indoor unit mounting surface part 12, it can easily be swept away or washed away by water through the entrance surface part 15.

The indoor unit accommodating space 13 is a space provided under the platform 11D in the operator's seat mounting part 11, and is configured as a space of a substantially rectangular-parallelepiped shape surrounded by the left side plate 11A, the right side plate 11B, the rear plate 11C and the platform 11D of the operator's seat mounting part 11, and the indoor unit mounting surface part 12. The indoor unit 24 to be described later can be accommodated within the indoor unit accommodating space 13. The indoor unit accommodating space 13 can increase a dimension H1 in the upper-lower direction between the indoor unit mounting surface part 12 and the platform 11D without changing the height position of the platform 11D by arranging the indoor unit mounting surface part 12 forming the bottom surface of the accommodating space 13 in a position lower by one step than the lever-pedal mounting part 10 and the foot rest part 16. As a result, the indoor unit 24, the pipes and the wires can naturally be accommodated within the indoor unit accommodating space 13 without increasing a height of the cab box 22.

Figure 5:
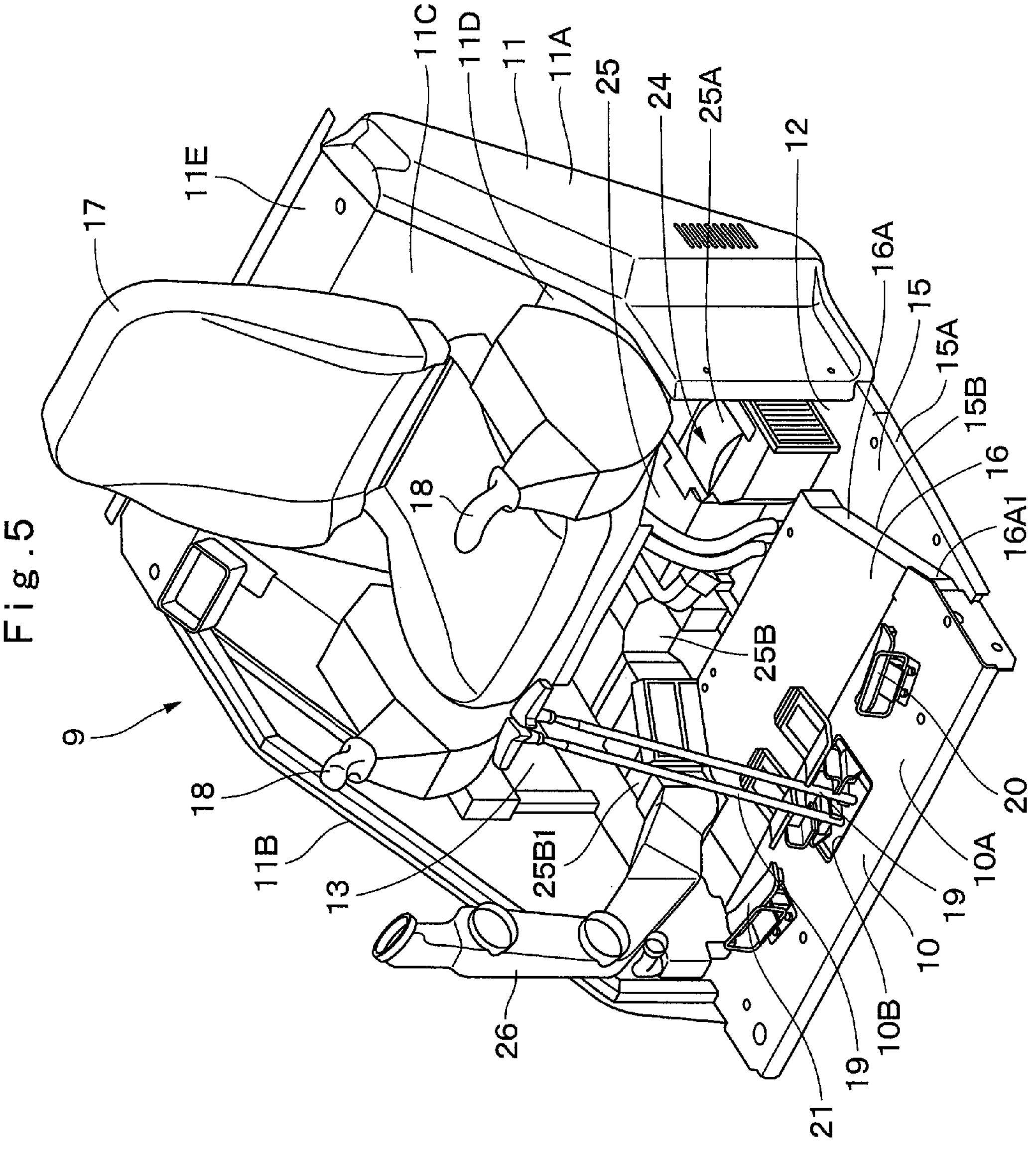
FIG. 5 is an external perspective view showing the floor member, the operator's seat, the various operating levers, the pedals, the indoor unit and the like in a state where the front cover is removed.

The duct mounting surface part 14 is provided in the right front side of the indoor unit mounting surface part 12, and is formed to be lower by the dimension H2 in the upper-lower direction than the lever-pedal mounting part 10 and the foot rest part 16. That is, the duct mounting surface part 14 is formed as a successive plane with the indoor unit mounting surface part 12 successively extending with each other. The duct mounting surface part 14 is formed in a concave groove shape between the right side plate 11B of the operator's seat mounting part 11 at the opposite to a door 22F of the cab box 22 and a right falling portion 16C of the foot rest part 16 to be described later to extend forward along the right side plate 11B and the falling portion 16C from the front side position of the indoor unit mounting surface part 12. As shown in FIG. 5, the duct mounting surface part 14 accommodates a lower side portion of a front side air supply duct 26 for supplying conditioned air to a front side of an occupying space 23 to be described later. As a result, the duct mounting surface part 14 enables the front side air supply duct 26 to be connected to the indoor unit 24 arranged in a position lower by one step than the lever-pedal mounting part 10 and the foot rest part 16.

Figure 7:
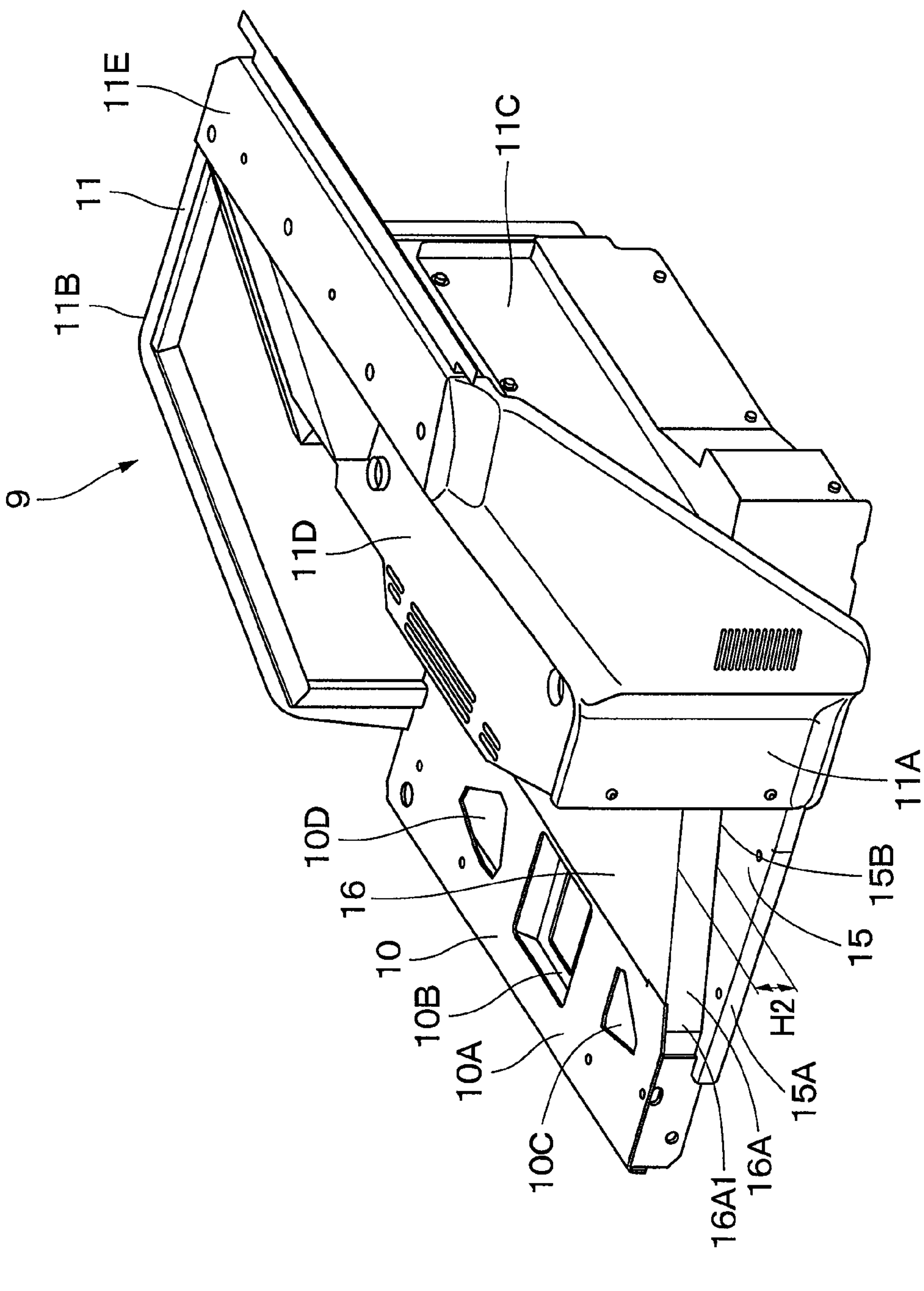
FIG. 7 is an external perspective view showing the floor member as viewed from a rear side.
Figure 8:
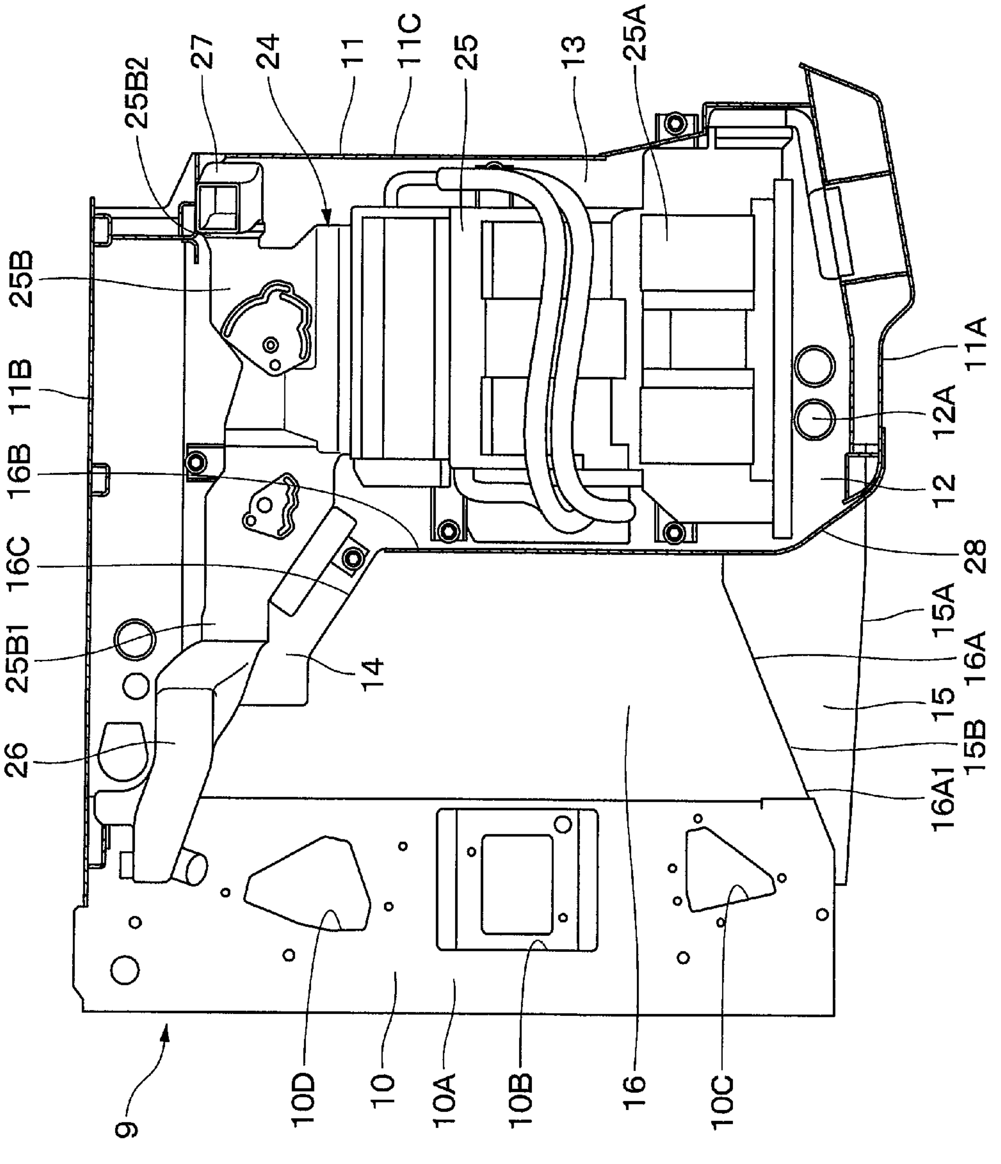
FIG. 8 is a transverse cross section showing the floor member, the indoor unit, an air supply duct and the like as viewed in the direction of arrows VIII-VIII in FIG. 4.

The entrance surface part 15 is provided in the left front side of the floor member 9. The entrance surface part 15 is provided in a side of the door 22F (left side) of the cab box 22 to be positioned between the indoor unit mounting surface part 12 and the lever-pedal mounting part 10, and forms a step to place a foot at getting-in/off. As shown in FIG. 8 and FIG. 9, the entrance surface part 15 is formed as a triangular plane in a triangular shape positioned between a left falling portion 16A of the foot rest part 16 and a left end edge portion 15A in a side of the door 22F. As shown in FIG. 7, the entrance surface part 15 is formed as a successive plane with the indoor unit mounting surface part 12 successively extending with each other in a position lower by the dimension H2 in the upper-lower direction than the lever-pedal mounting part 10 and the foot rest part 16.

Here, the entrance surface part 15 has the left end edge portion 15A in a side of the door 22F, which extends substantially straight in the front-rear direction. On the other hand, the right end edge portion 15B forming a boundary to the falling portion 16A is inclined in a direction of leaving the door 22F toward the rear side along the falling portion 16A of the foot rest part 16. Therefore, the entrance surface part 15 is formed as a triangular plane having a wider width toward the rear side while setting a position of a front end portion 16A1 of the falling portion 16A to be described later as an apex, between the falling portion 16A of the foot rest part 16 and the left end edge portion 15A of the cab box 22. With such a triangular shape, the entrance surface part 15 can form a foot step area in the rear side to be wide while avoiding a spare operating pedal 20 to be described later and the like. Therefore, when an operator gets on/off the floor member 9, the operator can certainly place a foot on the entrance surface part 15 by utilizing a wide spot in the foot step area to enhance reliability to the incoming/outgoing movement of the operator.

Further, the entrance surface part 15 is provided in a low position lower by one step the footrest part 16, and thereby a height dimension from the top surface of the lower traveling structure 2 to the entrance surface part 15 can be made small. As shown in FIG. 3, the entrance surface part 15 reaches an outside in a state where the door 22F of the cab box 22 is opened, and water, earth and sand and the like can be discharged to an outside through the entrance surface part 15.

Figure 10:
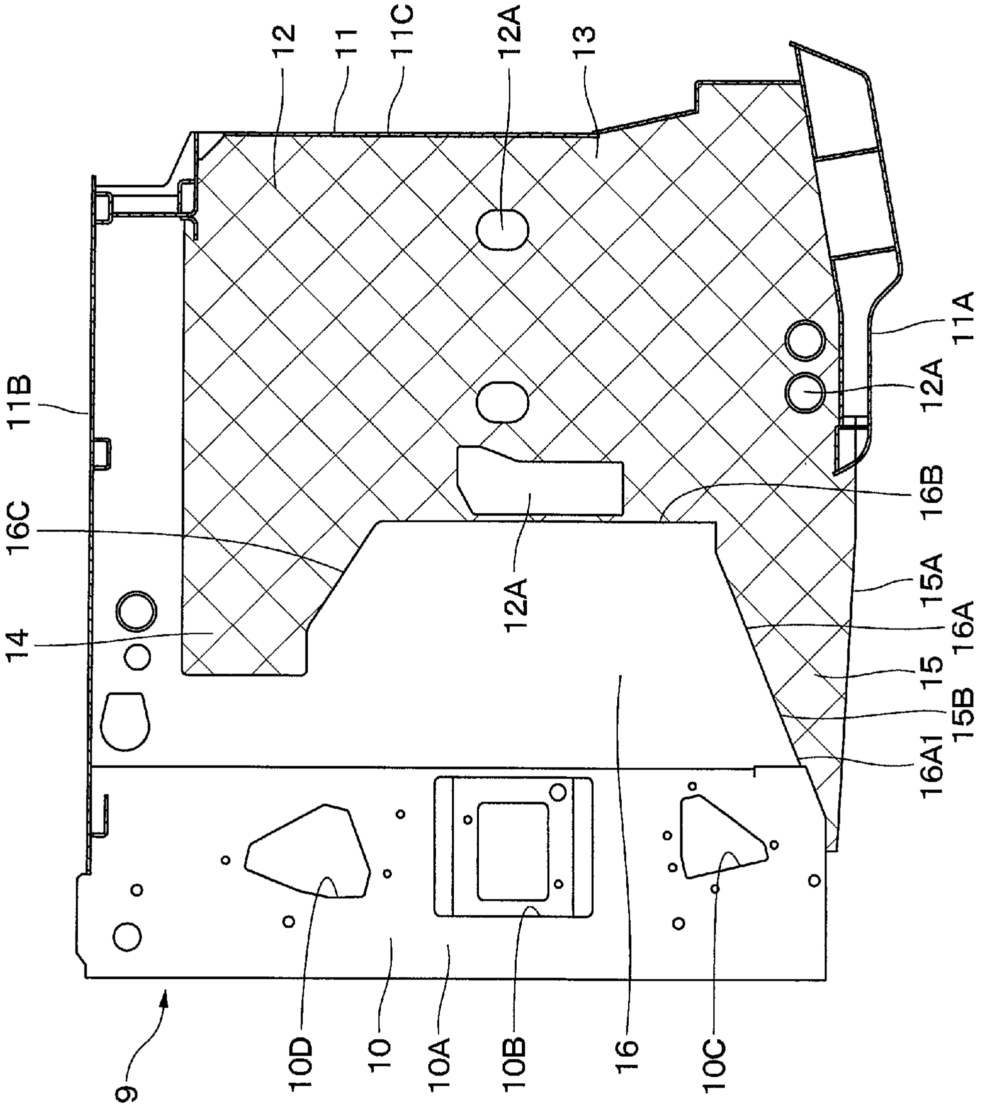
FIG. 10 is a transverse cross section showing an indoor unit mounting surface part, an entrance surface part, and a duct mounting surface part in a mesh pattern as viewed from a position similar to FIG. 9.
Figure 11:
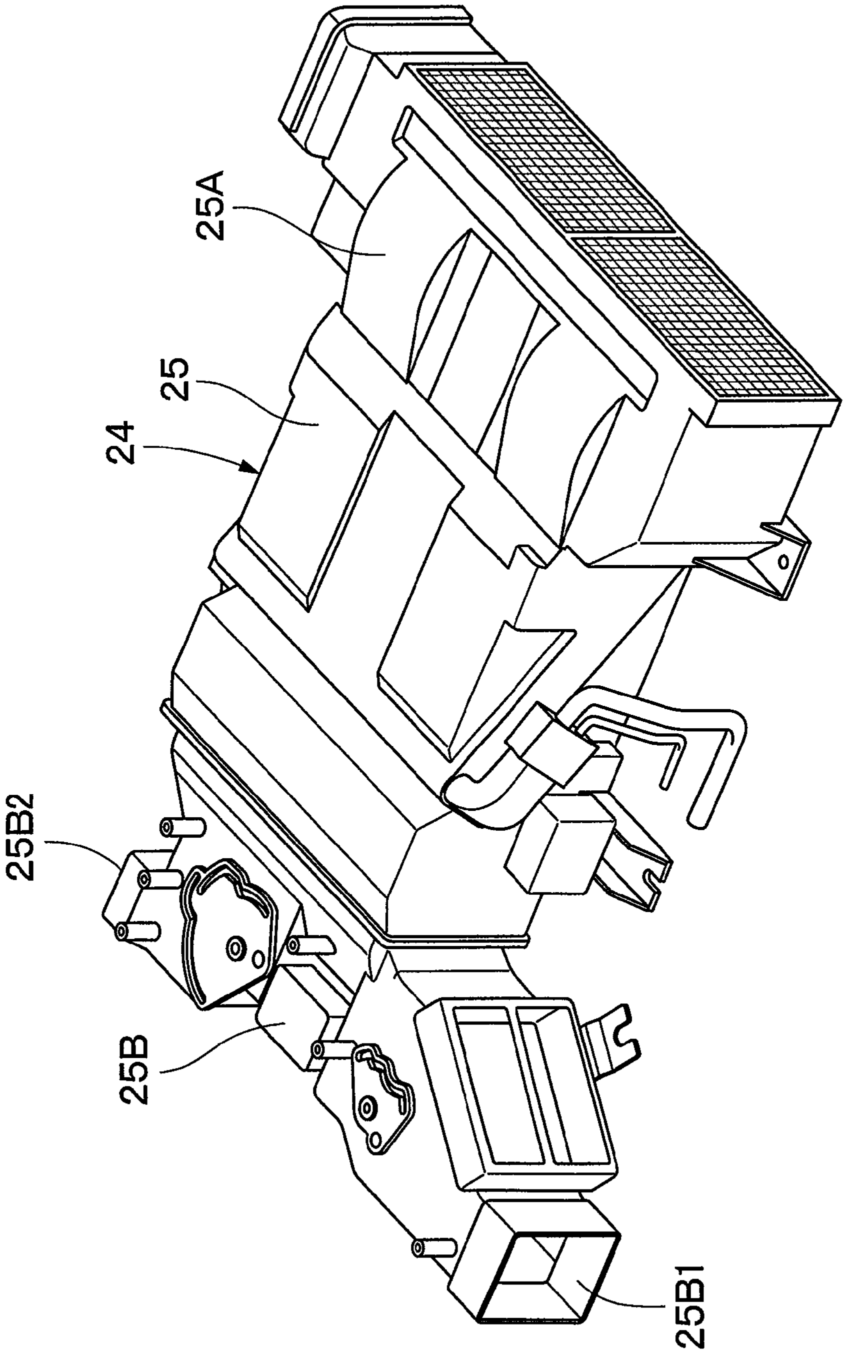
FIG. 11 is an external perspective view showing the indoor unit as a single unit in an enlarged form.

In a range of the indoor unit mounting surface part 12, the duct mounting surface part 14 and the entrance surface part 15, that is, in a range shown in a net pattern in FIG. 10, either one of them is arranged in a position lower by the height dimension H1 than the lever-pedal mounting part 10 and the foot rest part 16. As a result, the indoor unit mounting surface part 12, the duct mounting surface part 14 and the entrance surface part 15 form a successive plane successively extending with each other. Therefore, the indoor unit mounting surface part 12, the duct mounting surface part 14 and the entrance surface part 15 are formed as the same plane.

The foot rest part 16 is provided in front of the operator's seat mounting part 11, on which an operator seated on the operator's seat 17 places a foot. The foot rest part 16 is provided to be surrounded by the lever-pedal mounting part 10, the indoor unit mounting surface part 12, and the entrance surface part 15. Specifically, the foot rest part 16 is surrounded by the indoor unit mounting surface part 12, the entrance surface part 15 and the duct mounting surface part 14, and is formed as a trapezoidal plane extending in a trapezoidal shape toward the rear side from the lever-pedal mounting part 10.

The foot rest part 16 forms a successive plane with the lever-pedal mounting part 10 successively extending from each other, in a height position where an operator seated on the operator's seat 17 can place a foot. As a result, the foot rest part 16 is arranged in a position higher by the height dimension H1 than the indoor unit mounting surface part 12, the duct mounting surface part 14 and the entrance surface part 15. A door-side end portion of the foot rest part 16 is bent to form the left falling portion 16A extending in the lower side, and the right end edge portion 15B of the entrance surface part 15 is connected to a lower end portion of the falling portion 16A.

Here, the falling portion 16A is formed to be inclined in a direction of leaving the door 22F of the cab box 22 toward the rear side to have the front end portion 16A1 as a starting point. Therefore, the right end edge portion 15B of the entrance surface part 15 connected to the lower end portion of the falling portion 16A leaves the left end edge portion 15A toward the rear side, thereby forming the entrance surface part 15 as the triangular plane. On the other hand, a rear end 16B of the foot rest part 16 makes contact with a lower end portion of a front cover 28 to be described later, and a side end of the foot rest part 16 at the opposite to the door 22F makes contact with the front side air supply duct 26 to be described later. Further, the right falling portion 16C of the foot rest part 16 is inclined in a direction of leaving the right side plate 11B toward the rear end 16B.

Accordingly, the foot rest part 16 is a trapezoidal plane formed in a trapezoidal shape toward the rear end 16B as a whole. As a result, since the foot rest part 16 can be formed as a front widening plane as a part placing foot as viewed from an operator seated on the operator's seat 17, a sufficient width for placing foot can be ensured in a state where the operator places a foot on one of pedals 19, 20, and 21 or out of them, or further in a state where the foot is at rest other than the working time.

The operator's seat 17 is provided on the floor member 9 (refer to FIG. 4 and FIG. 5), and is mounted on the platform 11D forming the operator's seat mounting part 11, in a central position in the right-left direction. The operator's seat 17 is where an operator is seated at the time of steering the hydraulic excavator 1.

Right and left working operating levers 18 are arranged in both sides of the operator's seat 17. Each operating lever 18 is made to tilt in the front-rear direction or in the right-left direction, thus operating the front working mechanism 4 and the like.

The right and left traveling operating lever-pedals 19 are provided in the lever-pedal mounting part 10 of the floor member 9 in front of the operator's seat 17. Each operating lever-pedal 19 controls a forward/backward movement of the hydraulic excavator 1, and is positioned in a central opening 10B of the lever-pedal mounting part 10 to be provided to be able to perform tilt operation in the front-rear direction.

Further, a spare operating pedal 20 is positioned in the left side of the operating lever-pedal 19 and is provided in a left opening 10C of the lever-pedal mounting part 10. The spare operating pedal 20 is operated at the time of driving a hydraulic unit to be additionally provided, that is, a breaker (not shown) or the like. On the other hand, a swinging operating pedal 21 is positioned in the right side of the operating lever-pedal 19 and is provided in aright opening 10D of the lever-pedal mounting part 10. The swinging operating pedal 21 performs a swing movement of the front working mechanism 4 in the right-left direction.

Indicated at 22 is the cab box (refer to FIG. 1 to FIG. 3) provided on the floor member 9, and the cab box 22 covers the periphery and the upper side of the floor member 9. The cab box 22 is formed in a box shape by a front surface 22A, a rear surface 22B, a left surface 22C, a right surface 22D and a top surface 22E, and a lower end thereof is mounted to a peripheral edge of the floor member 9. Therefore, the cab box 22 forms an occupying space 23 that is an occupying space of an operator on the floor member 9.

The door 22F is positioned to be closer to the front side to correspond to the foot rest part 16 of the floor member 9 and is provided in the left surface 22C that is an outer surface of the cab box 22 to be capable of opening/closing. When the door 22F is made to open, an operator can place a foot on the entrance surface part 15 to get in or get off the occupying space 23.

Next, the indoor unit 24 in the air-conditioning unit provided in the floor member 9 and the air supply ducts 26 and 27 will be explained.

Indicated at 24 is the indoor unit in the air-conditioning unit positioned within the indoor unit accommodating space 13 of the floor member 9 to be mounted on the indoor unit mounting surface part 12. The indoor unit 24 sucks in inner air in the cab box 22 or outer air as atmospheric air, which is supplied to the occupying space 23 in the cab box 22 as conditioned air adjusted to a desired temperature and humidity. The indoor unit 24 is connected to an outdoor unit in a side of the engine 7 through pipes and wires.

The indoor unit 24 accommodates a blower fan, an evaporator, a heater core (any of them is not shown) and the like within a box-shaped casing 25 extending in the right-left direction. A left side of the casing 25 that is in the upstream side thereof forms a suction portion 25A for sucking in the inner air or outer air, and a right side of the casing 25 that is in the downstream side thereof forms an air outlet portion 25B for blasting out the conditioned air. A front side connecting port 25B1 is provided in a front end portion extending in the front side from the air outlet portion 25B, and a rear side connecting port 25B2 is provided in a rear side of the air outlet portion 25B. As shown in FIG. 5 and FIG. 8, the front side air supply duct 26 to be described later is connected to the front side connecting port 25B1, and the rear side air supply duct 27 to be described later is connected to the rear side connecting port 25B2.

The front side air supply duct 26 supplies the conditioned air blown out from the indoor unit 24 in the air-conditioning unit to the front side of the occupying space 23. The front side air supply duct 26 has a base end side that is connected to the front side connecting port 25B1 of the air outlet portion 25B, and a front end side that extends forward and rises up. Here, the front side air supply duct 26 has the lower side portion that is accommodated within the duct mounting surface part 14 provided in the floor member 9, and therefore, the front side air supply duct 26 can be connected to the front side connecting port 25B1 arranged in a position lower by one step than the foot rest part 16.

The rear side air supply duct 27 supplies the conditioned air from the indoor unit 24 to the rear side of the occupying space 23 (refer to FIG. 8). The rear side air supply duct 27 has a base end side that is connected to the rear side connecting port 25B2 of the air outlet portion 25B, and an upper end side that extends upward.

The front cover 28 is provided in the front side of the operator's seat mounting part 11 (refer to FIG. 4), and the front cover 28 covers and hides the indoor unit 24 within the indoor unit accommodating space 13. The front cover 28 extends downward from the front end portion of the platform 11D in the operator's seat mounting part 11, and the lower end portion is arranged to make contact with the entrance surface part 15 and the foot rest part 16. Therefore, the front cover 28 can close a boundary position between the indoor unit mounting surface part 12 and the entrance surface part 15, which is lower by one step than the foot rest part 16.

The hydraulic excavator 1 according to the present embodiment has the above-mentioned configuration, and next, an operation thereof will be explained.

In a case where an operator gets in the occupying space 23, the operator opens the door 22F of the cab box 22 and places a foot on the entrance surface part 15 of the floor member 9. The operator who gets in the occupying space 23 is seated on the operator's seat 17 and operates the traveling operating lever-pedal 19, thus making the lower traveling structure 2 travel. On the other hand, when the operator operates the right/left operating lever 18, the front working mechanism 4 or the like is moved, making it possible to perform an excavating work of earth and sand and the like. At the working of the hydraulic excavator 1, the indoor unit 24 in the air-conditioning unit is operated to supply conditioned air to the occupying space 23, thus making it possible to improve the working environment of the occupying space 23.

In this way, according to the present embodiment, the indoor unit mounting surface part 12 which is provided within the indoor unit accommodating space 13 under the operator's seat mounting part 11 and to which the indoor unit 24 in the air-conditioning unit is mounted, and the entrance surface part 15 which is provided in a side of the door 22F of the cab box 22 and on which an operator places a foot at the getting-in/out form the successive plane successively extending with each other in a position lower by one step (position lower by the dimension H2 in the upper-lower direction) than the lever-pedal mounting part 10 and the foot rest part 16, that is, the indoor unit mounting surface part 12 and the entrance surface part 15 are configured to form the same plane.

Therefore, water or earth and sand which has entered into the indoor unit mounting surface part 12 can easily be swept away through the entrance surface part 15 by using a broom or the like, and the earth and sand and the like can be washed away with water. In this case, water or earth and sand can be discharged outside of the upper revolving structure 3 from the entrance surface part 15.

As a result, also in a case where the indoor unit mounting surface part 12 is provided in the position lower by the dimension H2 in the upper-lower direction than the foot rest part 16, water or earth and sand which has entered into the indoor unit mounting surface part 12 can easily be discharged through the entrance surface part 15 by a simple work. Thereby, the periphery of the indoor unit 24 can be cleaned to extend the lifetime of the indoor unit 24 and the pipes and wires connected thereto.

As described above, since the indoor unit mounting surface part 12 can be provided to be in a position lower than the foot rest part 16, the height dimension from the indoor unit mounting surface part 12 to the platform 11D is made to the large dimension H1, while the operator's seat 17 can be arranged in the height position preferable for an operator who is seated on the operator's seat 17. Therefore, even in a case where the height dimension of the cab box 22 is, as in the case of the small-sized hydraulic excavator 1, restricted to be low, a head clearance between a head of an operator who is seated on the operator's seat 17 and the top surface 22E of the cab box 22 can be made to be large to improve the working environment.

The concave groove-shaped duct mounting surface part 14 forming the successive plane with the indoor unit mounting surface part 12 successively extending with each other is provided in the right part of the floor member 9. As a result, the front side air supply duct 26 can be connected to the front side connecting port 25B1 of the air outlet portion 25B forming the casing 25 of the indoor unit 24 by the duct mounting surface part 14. Thereby, the mounting height of the front side air supply duct 26 can be made to be low, widening the occupying space 23 within the cab box 22.

On the other hand, the foot rest part 16 having the trapezoidal plane extending in a trapezoidal shape toward the rear side from the lever-pedal mounting part 10 can be provided by using the range surrounded by the indoor unit mounting surface part 12, the duct mounting surface part 14 and the entrance surface part 15. Thereby, in the height position of the foot rest part 16 where the operator who is seated on the operator's seat can place a foot, a driving control can be performed. Further, since the foot rest part 16 formed as the trapezoidal plane can be made to the front widening plane as viewed from the operator seated on the operator's seat 17, a sufficient width to place a foot can be ensured in a state where the operator places the foot on each of pedals 19, 20, and 21 and in a state where the foot is at rest other than the working time.

Since the entrance surface part 15 is formed as the triangular plane having a wider width from the front side to the rear side, the entrance surface part 15 can avoid the spare operating pedal 20 arranged in the lever-pedal mounting part 10, while being formed widely in the front-rear direction. As a result, when the operator gets in/off the floor member 9, the operator can certainly place the foot on the entrance surface part 15 by using the wide rear side of the foot step area, enhancing reliability to the getting-in/off movement.

Further, since the front cover 28 is provided in front of the operator's seat mounting part 11 on the floor member 9, in a state where the front cover 28 is mounted on the floor member 9, the indoor unit 24 provided within the indoor unit accommodating space 13 can be covered and hidden. On the other hand, when the front cover 28 is removed from the floor member 9, an inspection work, a repair work and the like of the indoor unit 24 can easily be performed.

It should be noted that the present embodiment is explained by citing a case where the entrance surface part 15 of the floor member 9 is formed as the triangular plane in the triangular shape having the wider width from the front side to the rear side as an example. However, the present invention is not limited thereto, and for example, the entrance surface part 15 may be formed as a plane formed in the other shape similar to the triangular plane, such as a semicircle-shaped plane or a fan-shaped plane, and the plane in such a shape is also included in an embodiment of the present invention.

In the present embodiment, a case where the floor member 9 and the cab box 22 are arranged in the left side of the upper revolving structure 3, and the getting-in/off door 22F is provided in the left surface 22C of the cab box 22 corresponding thereto is exemplified. However, the present invention is not limited thereto, and the floor member and the cab box may be arranged in the right side of the upper revolving structure. In this case, the door, the entrance surface part and the like may be arranged in the right side.

Further, the present embodiment is explained by citing the hydraulic excavator 1 equipped with the lower traveling structure 2 of a crawler type as a construction machine. However, the present invention is not limited thereto, and may be applied to a hydraulic excavator equipped with, for example, a lower traveling structure of a wheel type or the like. On the other hand, the present invention may be applied not only to the hydraulic excavator 1 but also to other revolving construction machines, such as a hydraulic crane.

DESCRIPTION OF REFERENCE NUMERALS

1: Hydraulic excavator (Construction machine)
2: Lower traveling structure
3: Upper revolving structure
4: Front working mechanism
6: Revolving frame
9: Floor member
10: Lever-pedal mounting part
11: Operator's seat mounting part
11A: Left side plate
11B: Right side plate
11C: Rear plate
11D: Platform
12: Indoor unit mounting surface part
13: Indoor unit accommodating space
14: Duct mounting surface part
15: Entrance surface part
15A: Left end edge portion
15B: Right end edge portion
16: Foot rest part
16A, 16C: Falling portion
16A1: Front end portion
16B: Rear end
17: Operator's seat
19: Traveling operating lever-pedal
22: Cab box
22C: Left surface (Outer surface)
22E: Top surface
22F: Door
23: Occupying space
24: Indoor unit
26: Front side air supply duct
28: Front cover
H1: Height dimension from indoor unit mounting surface part to platform
H2: Dimension difference in the upper-lower direction between lever-pedal mounting part, foot rest part and indoor unit mounting surface part, entrance surface part

The invention claimed is:

1. A construction machine comprising:
an automotive lower traveling structure;
an upper revolving structure mounted on said lower traveling structure to be capable of revolving thereon; and
a working mechanism provided to said upper revolving structure to be capable of lifting and tilting thereto, wherein
said upper revolving structure comprises:
a revolving frame forming a support structure;
a floor member which is provided on said revolving frame;
a cab box which is provided to cover the periphery and the upper side of said floor member, to form an occupying space therein, and includes a door capable of opening/closing on an outer surface in one of the right or left directions; and
an indoor unit in an air-conditioning unit mounted to said floor member for supplying intake air to said occupying space as conditioned air, characterized in that:
said floor member comprises:
a lever-pedal mounting part which is positioned at a front side of the floor member and to which a traveling lever-pedal is mounted;
a seat mounting part which is positioned at a rear side of the floor member and has left and right side plates, a rear plate, and on which a raised platform is formed and a seat is mounted;
an indoor unit mounting surface part which is positioned in an indoor unit accommodating space under said platform of said seat mounting part and on which said indoor unit is mounted;
an entrance surface part which is positioned between said indoor unit mounting surface part and said lever-pedal mounting part and is provided in a side of said door in said cab box; and
a foot rest part which has a front side bordered by said lever-pedal mounting part, a rear side bordered by said indoor unit mounting surface part and on one of the left or right sides thereof is bordered by said entrance surface part, wherein
said lever-pedal mounting part and said foot rest part together form a plane extending at a height below said seat, and
said indoor unit mounting surface part and said entrance surface part together form a plane extending at a height lower than the height of said lever-pedal mounting part and said foot rest part.

2. The construction machine according to claim 1, wherein,
said floor member is provided with a concave groove-shaped duct mounting surface part extending forward from said indoor unit mounting surface part between a side plate at the opposite side to said door and said foot rest part,
said duct mounting surface part is formed as a successive plane with said indoor unit mounting surface part successively extending with each other, and
said duct mounting surface part accommodates an air supply duct for supplying conditioned air blown out from said indoor unit to a front side of said occupying space.

3. The construction machine according to claim 2, wherein,
said foot rest part has a rear side bordered by said indoor unit mounting surface part, on one of the left or right sides thereof is bordered by said entrance surface part and the other one of the left or right sides thereof is bordered by said duct mounting surface part, and is formed as a trapezoidal plane extending in a trapezoidal shape from said lever-pedal mounting part toward the rear side.

4. The construction machine according to claim 1, wherein, said foot rest part is provided with a falling portion bent downward at a door side end portion, said falling portion is formed to be inclined in a direction of leaving said door in said cab box toward the rear side to have a front end portion as a starting point, and said entrance surface part is formed as a triangular plane in a triangular shape between said falling portion of said foot rest part and an end edge portion of said door side in said cab box.

5. The construction machine according to claim 1, wherein, said floor member is provided with a front cover at a front side of said seat mounting part for covering and hiding said indoor unit in said indoor unit accommodating space, wherein said front cover makes contact with a rear end of said foot rest part.

* * * * *